Aug. 3, 1943.  E. M. ARENTZEN ET AL  2,325,730
MINE HAULAGE VEHICLE
Filed Nov. 6, 1941  6 Sheets-Sheet 1
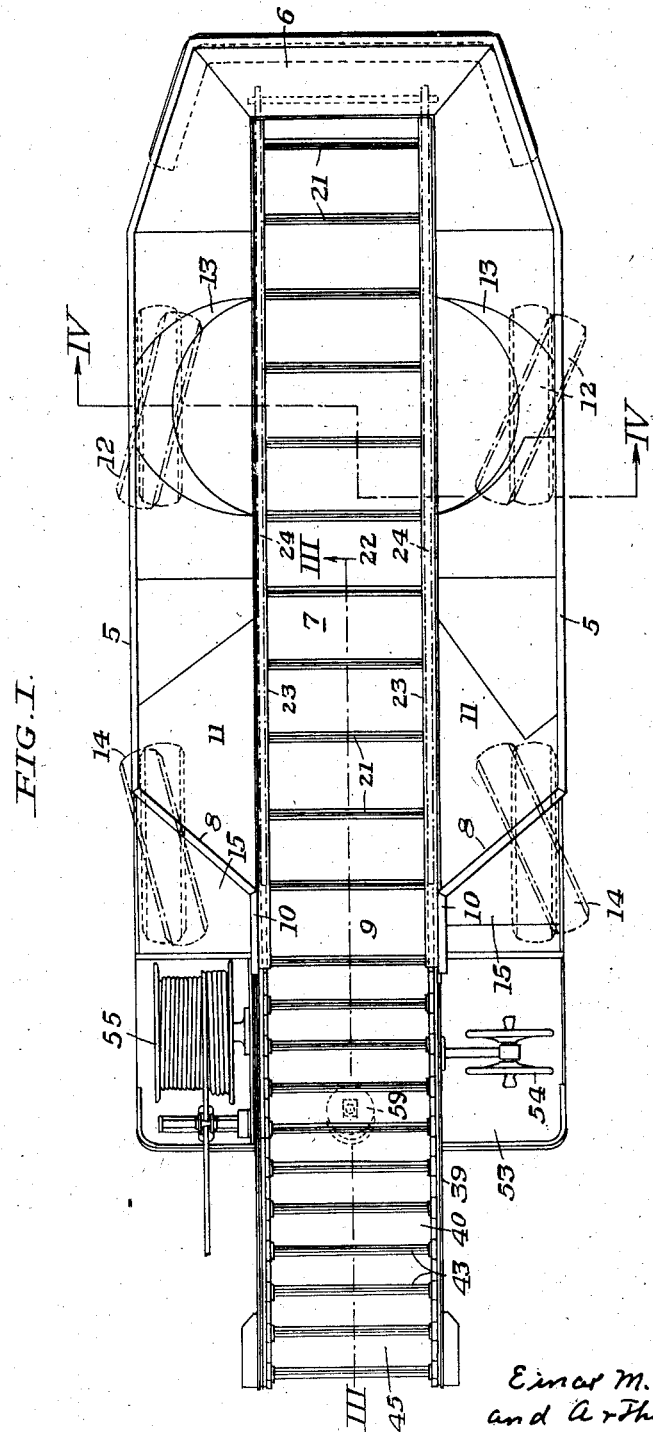
INVENTORS
Einar M. Arentzen
and Arthur L. Lee
by William B. Wharton
their attorney Aug. 3, 1943.　　E. M. ARENTZEN ET AL　　2,325,730
MINE HAULAGE VEHICLE
Filed Nov. 6, 1941　　6 Sheets-Sheet 2
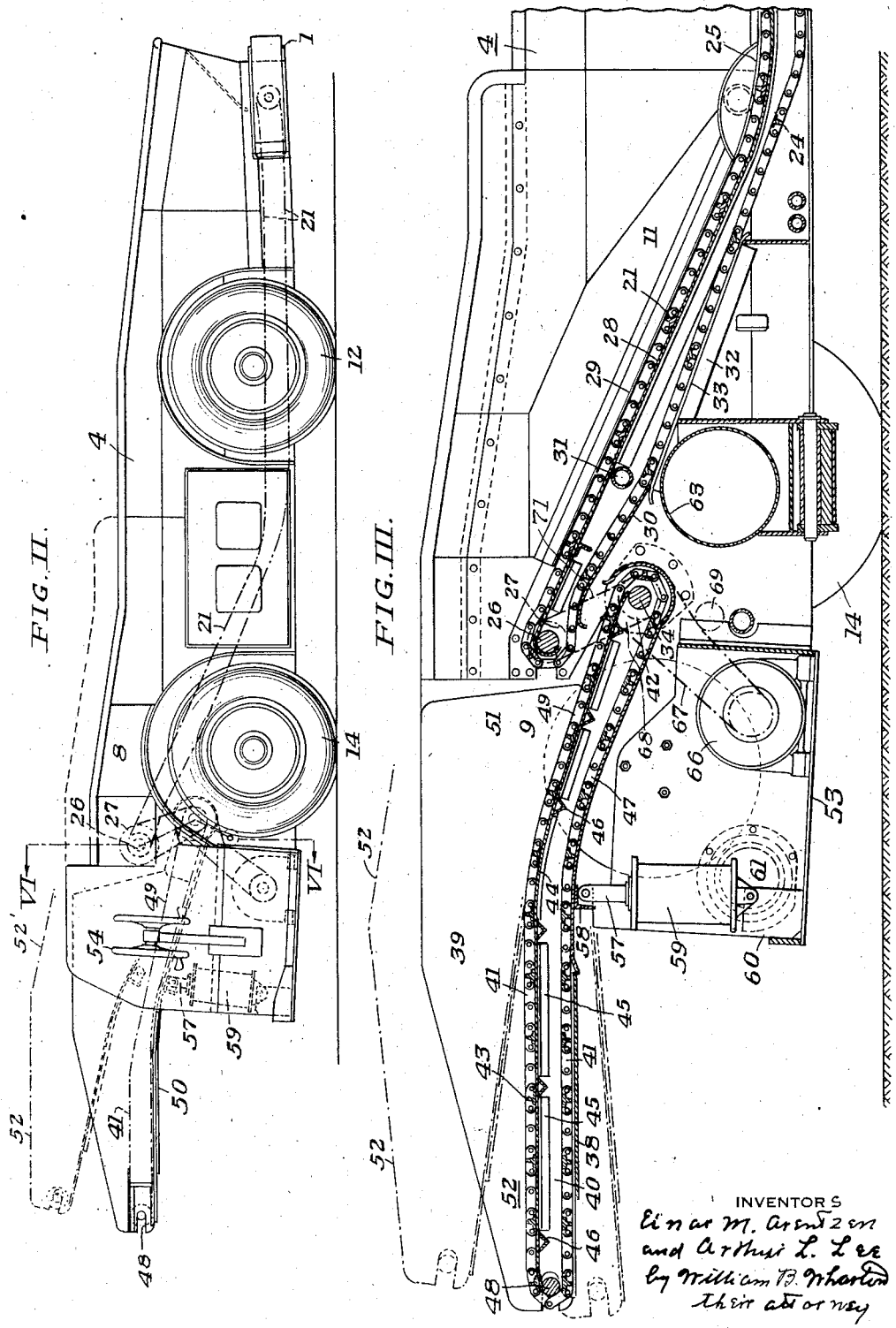
INVENTORS
Einar M. Arentzen
and Arthur L. Lee
by William B. Wharton
their attorney

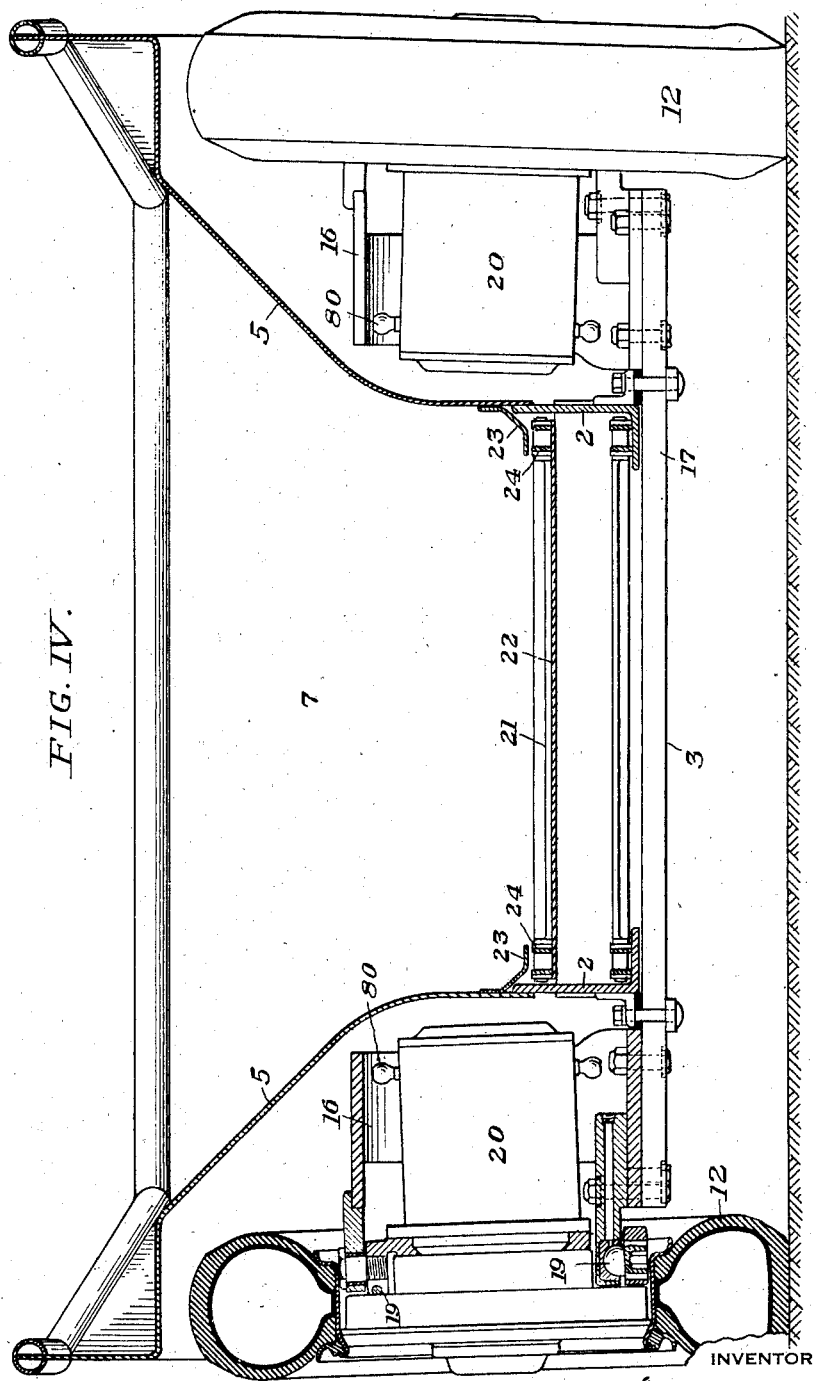

Aug. 3, 1943.  E. M. ARENTZEN ET AL  2,325,730
MINE HAULAGE VEHICLE
Filed Nov. 6, 1941   6 Sheets-Sheet 4
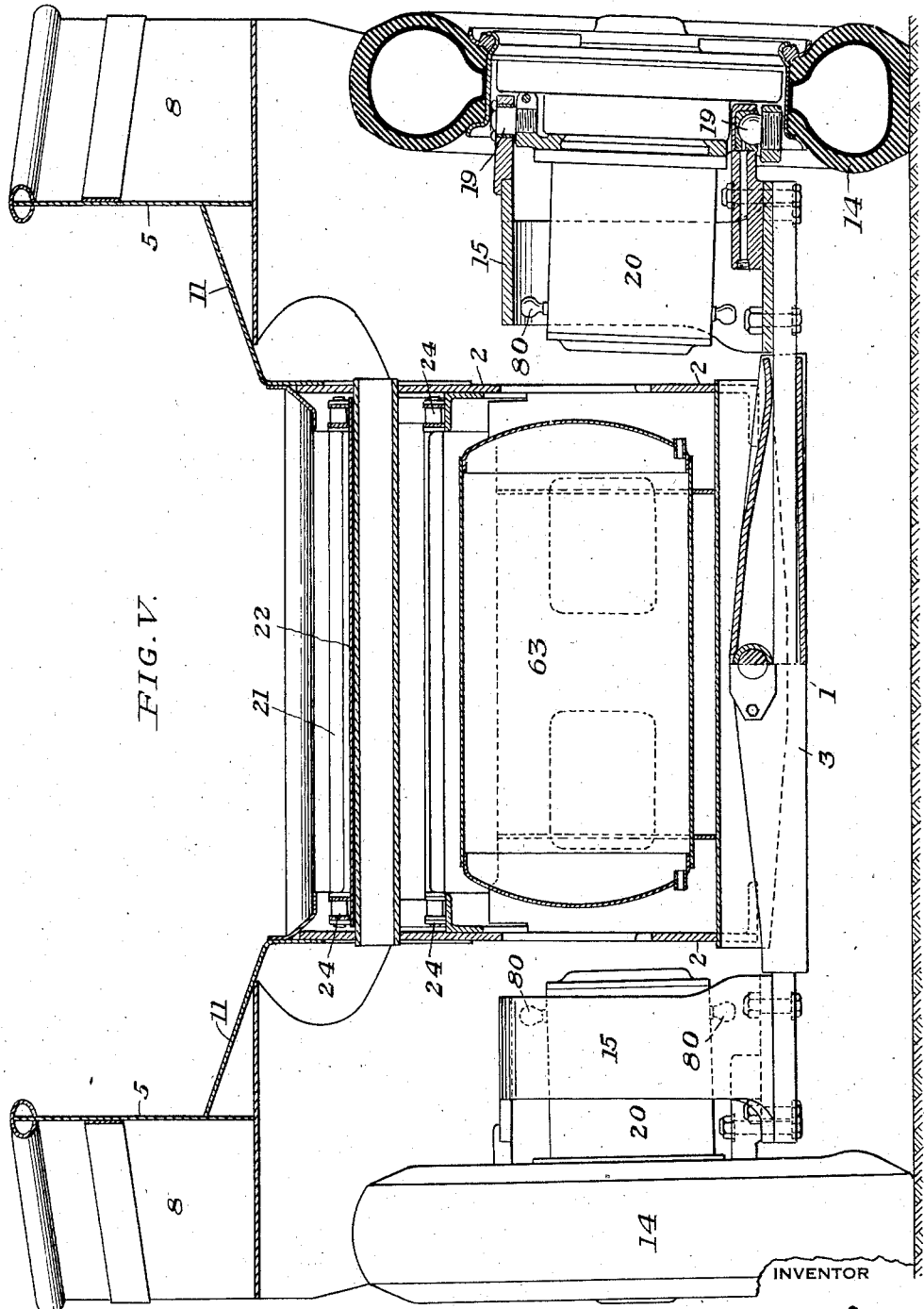
INVENTOR
Einar M. Arentzen and Arthur L. Lee
by William B. Wharton
their attorney Aug. 3, 1943.   E. M. ARENTZEN ET AL   2,325,730
MINE HAULAGE VEHICLE
Filed Nov. 6, 1941   6 Sheets-Sheet 5
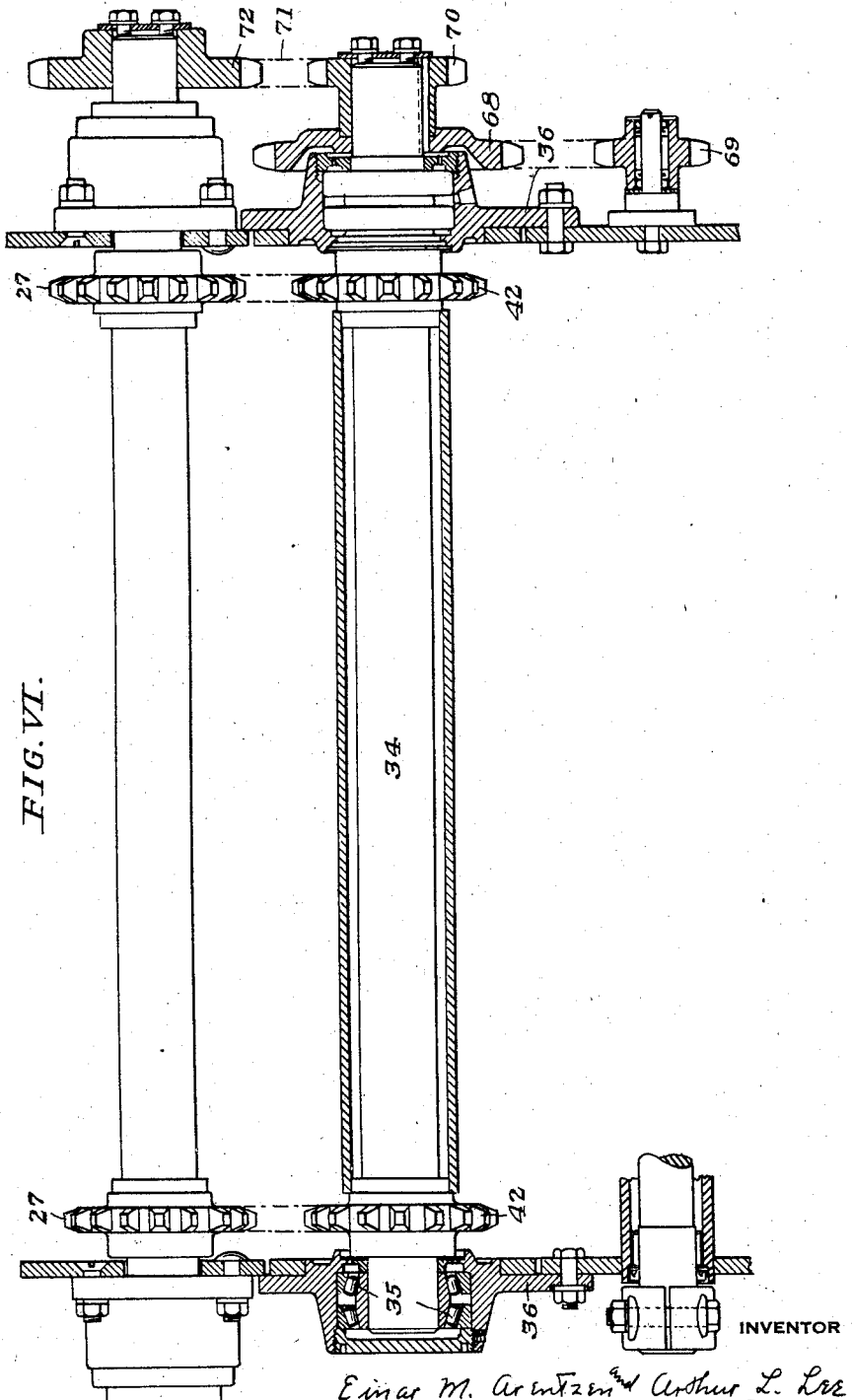
INVENTOR
Einar M. Arentzen and Arthur L. Lee
by William B. Wharton
their attorney

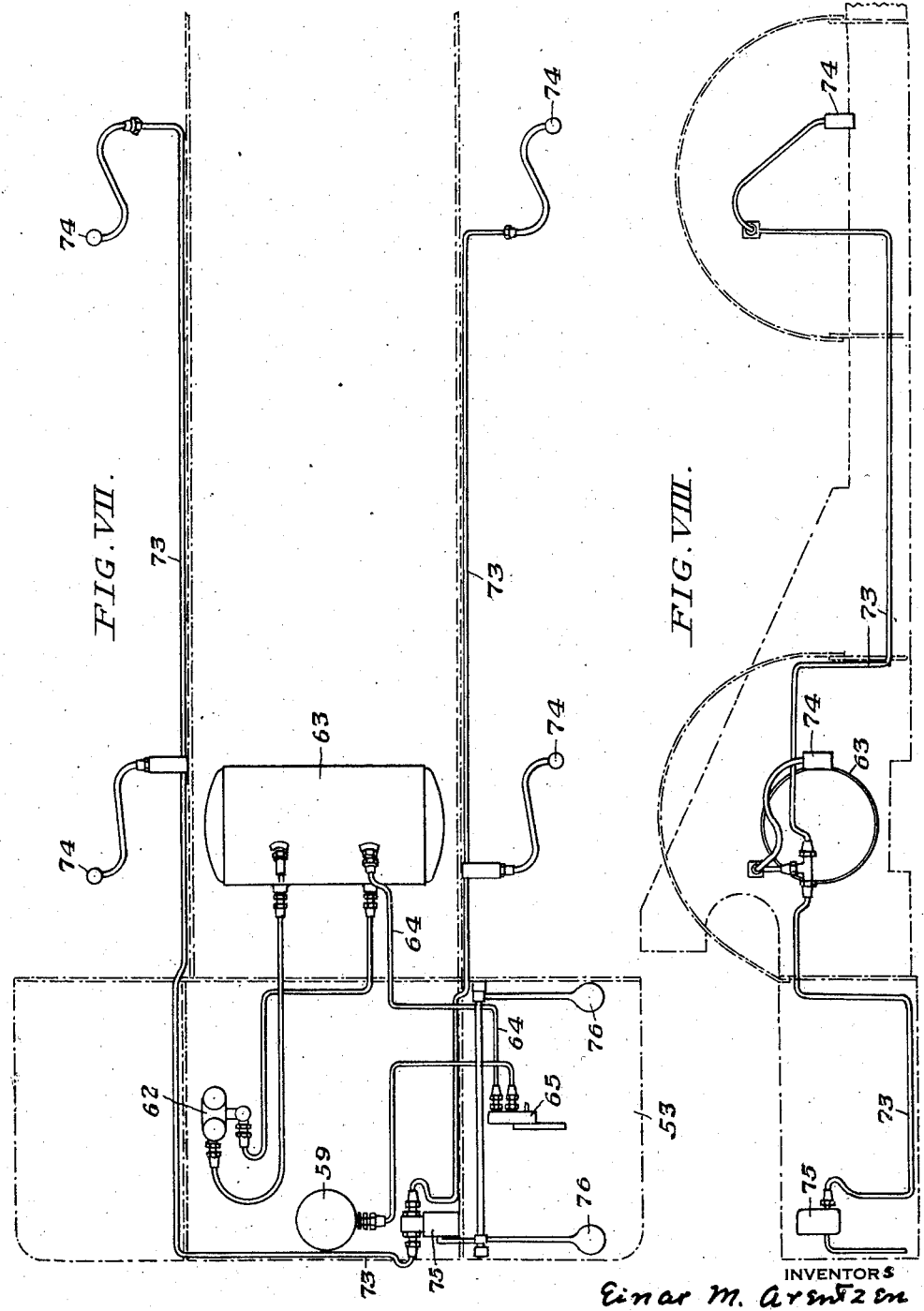

Patented Aug. 3, 1943

2,325,730

UNITED STATES PATENT OFFICE 2,325,730

MINE HAULAGE VEHICLE

Einar M. Arentzen, Charleroi, and Arthur L. Lee, Oakmont, Pa., assignors, by mesne assignments, to Joy Manufacturing Company, Franklin, Pa., a corporation Application November 6, 1941, Serial No. 418,028

5 Claims. (Cl. 214—83)

This invention relates to self-unloading vehicles of the kind used in mines, particularly for shuttle service between a working face of a mine and a point at which track mine cars are loaded.

Mine conditions impose certain limitations on vehicles used in them, the restriction of the permissible height being the most important relating to this invention. Mine-haulage vehicles of the self-unloading type have heretofore been proposed; which vehicles by reason of the height restriction imposed upon them, have been of a type comprising a low body enclosed by side and end walls, and a low-level, substantially horizontal conveyor forming the bottom of the body and movable towards a discharge opening at an end of the vehicle. The use of such vehicles entails considerable inconvenience particularly because, by reason of the low level at which their bottoms are located, they cannot be emptied over the sides of mine cars without resort to some sort of an elevating arrangement. Usually ramps are built at places where the shuttle vehicles are to be discharged into mine track cars. This entails the inconvenience of constructing a ramp at each loading place, and restriction of loading to the places at which such ramps are located, in addition to certain operating difficulties such as the necessity of a clear approach to the ramp and the difficulties involved in driving the vehicles up the inclined, often steep, surfaces.

It obviously would be advantageous to use self-unloading vehicles having discharge levels sufficiently high to enable them to deliver over the sides of track cars while remaining on the floor level, but the restriction of the overall height of mine vehicles heretofore has precluded the use of vehicles having sufficiently high discharge levels such as are suitable for use above ground.

The principal object of this invention is to provide a self-unloading vehicle of such low overall height as to render it practically usable in mines, and that is capable of unloading its cargo directly over the side of a track car from the floor level and without resort to ramps or other car-elevating devices.

Another object is to provide in such a vehicle a novel arrangement of a bottom-forming conveyor that permits assembly with the vehicle of an auxiliary delivery conveyor in such relation as to receive material from the bottom-forming conveyor, and also permits an arrangement of such an auxiliary conveyor that the overall height of the vehicle is not increased by the auxiliary delivery conveyor.

Still another object is the provision in a vehicle of the type in question of a novel mounting and arrangement of an auxiliary delivery conveyor permitting such conveyor to discharge at a level sufficiently high to deliver over the side of a track car supported at the same level as the vehicle, while providing cargo-carrying space in the body of the vehicle adequate for coal haulage.

A further object is the provision of a novel relative arrangement of body structure and bottom-forming and delivery conveyors that permits discharge from the vehicle body of a relatively deep stream of material to a shallow delivery conveyor without lateral overflow of the delivery conveyor.

An additional object is to provide a novel operating system for vertically swinging a conveyor pivotally mounted to a vehicle, such system being arranged to afford a cushioned support for the conveyor to permit the conveyor to yield downwardly upon contacting overhead objects during travel of the vehicle.

We have solved the problems involved in providing a self-unloading vehicle of low overall height having a high level discharge and a low level bottom by upwardly inclining the bottom-forming or main conveyor in a region adjacent and leading to the discharge end of the vehicle to a discharge point sufficiently high to permit arrangement of the receiving area of an auxiliary delivery conveyor under such discharge end to receive material discharged by the bottom-forming or main conveyor, and by so mounting the delivery conveyor that it is movable between a lowered position entirely below the level of the topmost surface of the vehicle and a raised position with its discharge end at a height to discharge over the side of the track car.

Such an arrangement involves secondary problems. By reason of the depth of material forming a cargo in the vehicle, the moving bottom-forming conveyor carries a stream of material of considerable depth to the discharge opening, and the depth of this stream of material limits the height to which the discharge end of the bottom-forming conveyor may be elevated, since it is essential that the side walls of the vehicle extend above the level of the conveyor sufficiently to confine the material against lateral overflow. The overall height of the side walls being limited by mine conditions, the provision of side walls can be achieved only by spacing the discharge end of the bottom-forming conveyor below the upper margins of the walls. We have solved the problem of confining the deep stream of material that is carried by the bottom-forming conveyor against lateral overflow by positioning the discharge end of the bottom-forming conveyor at a height limited to substantially that required for the positioning of an auxiliary delivery conveyor under it.

A second problem arising from the delivery by the bottom-forming conveyor of a relatively deep stream of material arises by reason of the fact that the permissible height of the delivery conveyor is limited. Because of this restriction of the overall height of the vehicle, and the desirability of utilizing the full space enclosed by the body for cargo, operating means for swinging the delivery conveyor must be positioned below the delivery conveyor, which positioning fixes a definite level below which the conveyor structure may not extend, and the overall height limitation of the vehicle fixes the permissible height of the conveyor above this level, at a level too low to permit the use of material-retaining side walls extended throughout the length of the delivery conveyor at a height sufficient to retain a stream of material having a depth equal to the stream discharged by the bottom-forming conveyor. We have solved this problem by driving the delivery conveyor at a speed sufficiently higher than that of the bottom-forming conveyor to thin the stream of material moved by the auxiliary conveyor to a depth substantially less than the depth of material on the bottom conveyor of the vehicle.

In the accompanying drawings:

Fig. I is a plan view of a mine-haulage vehicle embodying our invention.

Fig. II is an elevation thereof.

Fig. III is an enlarged vertical sectional view at the discharge end of the vehicle taken in the plane of the section line III—III of Fig. I, showing the relation of the conveyors and the drive and controlling means therefor.

Fig. IV is a vertical transverse section through the rear part of the vehicle, taken in the plane of the section line IV—IV of Fig. I and looking toward the rear or receiving end of the vehicle.

Fig. V is a transverse vertical section through the forward part of the vehicle, taken on an irregular section line in the region of the forward wheels of the vehicle and looking toward the rear or receiving end of the vehicle.

Fig. VI is a fragmentary vertical sectional view, taken in the plane of the section line VI—VI of Fig. II and looking toward the forward or receiving end of the vehicle, showing the interrelation and positioning of the drive shafts for the conveyors.

Fig. VII is a diagrammatic illustration in plan of a fluid-pressure system for supporting and moving the auxiliary conveyor, and also illustrates a hydraulic brake system.

Fig. VIII is a diagrammatic side elevation of such systems.

Describing the drawings in detail, the main framework of the vehicle is designated generally 1, and includes longitudinal side members 2 and cross members 3. Suitably supported on these frame elements is a body structure 4, comprising side walls 5 and a rear end wall 6, such walls being so arranged as to enclose the cargo space 7. Referring to Fig. IV, it will be seen that the walls are so formed that the cargo space 7 is hopper-shaped, the walls being downwardly and inwardly inclined.

The cargo space 7 is terminated forwardly at a vertical, inwardly inclined, delivery opening 9 defined by walls 8 and guard plates 10. Forwardly and upwardly inclined body-forming walls 11, which walls 11 are also inclined upwardly and outwardly, connect the inclined side walls 5 with the inclined walls 8 defining the delivery opening.

The load-carrying structure of the vehicle is mounted on wheels which are preferably of the self-powered type and mounted for four-wheel steering. As illustrated, rear wheels 12 are mounted within wheel pockets 13 that are arranged in the inclined portions of the side walls 5. Front wheels 14 are centered adjacent the delivery region provided by the inwardly inclined walls 8, and partially underlie the inclined bottom-forming walls 11. Wheel guards 15 are arranged partially over the front wheels 14. As shown in Figs. IV and V, the wheels 12 and 14 are mounted to wheel-supporting brackets 16 that, in the case of the rear wheels, are carried by a transverse mounting plate or bar 17 rigidly secured to the longitudinal frame members 2, and, in the case of the front wheels 14, are carried by a yielding mounting structure of the sort disclosed in the co-pending application of Arthur L. Lee, Serial No. 383,330, filed March 14, 1941. As shown in that application, each wheel assembly has a spindle mounting 19 and carries its individual driving motor 20.

The bottom of the cargo space 7 is formed by an endless belt conveyor 21 running over a bed plate 22 supported by the longitudinal frame members 2. Guide members 23 that are suitably secured in overlying relation to chain elements 24 of the conveyor secure the belt in its proper relation to the bed plate 22.

The conveyor is inclined upwardly, as indicated in Fig. III, from a point 25 arranged substantially at the rearward line of the upwardly inclined bottom walls 11. The upwardly and forwardly moving reach of the conveyor 21 extends to delivery zone 9, and there travels around a roller 26 with the sprockets 27 of which the chain elements of the conveyor engage. Through its upwardly and forwardly inclining reach the conveyor is supported on an inclined bed plate 28, and is arranged under guide members 29 that overlie the chain structure of the conveyor. The return, declining reach of the conveyor is supported in its forward region by a transversely extended declined plate 30, best shown in Fig. III, which is so formed as to carry the conveyor upwardly to provide clearance for the auxiliary conveyor which will be later herein described. The plate 30 is extended continuously across the conveyor 21 to protect it from contact with any material that may be carried between it and the auxiliary conveyor. The rearward portion of the plate 30 is declined at such an angle as to provide clearance for a cross element 31 that is extended transversely of the vehicle structure between the two reaches of the conveyor. To the rear of the plate 30 the return declining reach of the conveyor is supported by side guides 32 in the form of angles secured to the side structure of the vehicle, and having horizontal flanges 33 that underlie and support the side chains of the conveyor.

As indicated above, we provide an auxiliary conveyor by means of which material enclosed in the cargo space may be delivered at a level higher than the delivery point at which main conveyor 21 unloads the cargo-containing structure of the car. Referring to Fig. III, a cross shaft 34 is arranged at a point spaced below and slightly to the rear of the conveyor roller 26, and also spaced below the plate 30. This cross shaft 34 is revolubly mounted in bearings 35 that are secured in vertical plates 36. A conveyor structure, designated generally 37, is supported upon the shaft 34 for pivotal swinging in vertical directions. The conveyor structure 37 comprises a bottom plate 38 which, together with vertical side plates 39, provides a trough for conveying and delivering material received from the cargo-carrying portion of the vehicle. Within the trough formed by the bottom and side plates 38 and 39 is an endless belt conveyor 40, trained about the shaft 34, and having side sprocket chains 41 that engage sprocket wheels 42 secured to the shaft 34. The conveyor 40 extends through the trough in an upper reach 43, supported by a bed plate 44 that rests upon angles 45 mounted upon the inner surface of the side plates 39. Cross angle bars 46, arranged at intervals between the angles 45, tie the side plates 39 together and increase the stability of the structure. The return reach 47 of the conveyor travels over the bottom plate 38. At its forward end the conveyor belt is trained around a roller 48 mounted adjacent the ends of the side plates 39.

In order to permit use of this conveyor under conditions that limit the overall height of the vehicle, the relationship of the side walls of the cargo-enclosing space and the conveyors is as follows: The level of the upper margins of the side walls is limited by restriction of the overall height of the vehicle, due to service conditions. It is obviously desirable that the delivery of the bottom-forming conveyor 21 be as high as practically possible, but because of the restriction of the height of the walls and the necessity of providing side walls that extend above the conveyor a sufficient distance to retain material carried by the conveyor against lateral overflow, it is essential that the roller 27 be spaced below the fixed upper margin of the guard plates 10 at the discharge end of conveyor 21 a distance sufficient to retain the material. Additionally, by reason of the fact that the available space in a vehicle of this kind is limited, certain operating mechanism advantageously is placed under the auxiliary conveyor structure 37, and therefore there is a limitation to the amount that the conveyor structure 37 may be spaced below the upper margin of the vehicle.

An additional factor that must be considered in arranging this assembly is that, although ultimate delivery of the material is to be at a point higher than the overall height of the car, the arrangement must be such as to permit operation of the vehicle in places of limited headroom. The problem raised by these various elements is that of providing an auxiliary conveyor structure of a height restricted by the necessity of mounting it at a relatively high level of the vehicle. This problem has been solved by longitudinally curving the auxiliary conveyor 37 to provide a rear, relatively sharply inclined portion 49, and a forward portion 50 arranged at a lesser inclination. This permits the side plates 39 of the auxiliary conveyor to have rearward portions 51 of substantial height, the forward portions 52 of the side plates being tapered downwardly and forwardly. Referring to Fig. III, and especially the upper position indicated by dotted lines 52, it will be seen that this arrangement is such as to permit raising the conveyor to such an extent that its delivery point is relatively high without materially exceeding the overall height of the vehicle and that it also permits the auxiliary conveyor structure 37 to be swung down to a position completely within the overall height of the vehicle.

It will be noted also from Fig. III that the configuration of the side plates 39 provides a relatively deep rear portion to which delivery is made by the main conveyor 21. It will be understood that, in the operation of the main conveyor 21, by reason of the relatively great depth of the cargo space 7, a stream of material of substantial depth will be delivered at the discharge end of the conveyor. As indicated before, guard plates 10 of the body structure are of such vertical height as to retain this stream of material against lateral overflow. Because of the lack of height of the guard plates defining the width of the auxiliary conveyor in at least its forward portion, the auxiliary conveyor should not carry a stream of material as deep as the stream carried to its delivery point by the main conveyor 21. Also there is substantial advantage in delivering the material to a mine car, or other receptacle in a relatively thin stream which will pile evenly and which will not tend to jump the sides of the receptacle as it fills. In our vehicle we avoid overflow of material at the sides of the auxiliary conveyor and deliver the material from the auxiliary conveyor, without retarding the discharge of material from the cargo-carrying body of the vehicle, by means which will be described later herein.

The operating and control mechanism for the vehicle is advantageously mounted on a platform 53 that is supported upon the body structure ahead of the cargo portion, and that extends transversely of the vehicle at a low level and under the auxiliary conveyor structure 37. Upon the platform 53 are mounted on one side a steering wheel 54 which, it will be understood, is connected operatively with one of the steering balls 80 carried by each of the wheel motors 20, by suitable linkage, not shown. Upon the opposite side is mounted a cable reel 55. Also mounted on the platform 53, and disposed centrally and under the conveyor structure 37, is a fluid-pressure cylinder and piston assembly in generally vertical disposition and having one element, as the piston rod 57, connected with the conveyor structure 37 through a reinforcing angle 58. The elements 57 and 59 are connected to the angle 58 and a bracket 60 by pivots 56 and 61 respectively, to permit pivotal movement of the assembly during swinging of the conveyor structure 37 about the shaft 34.

Referring to Figs. VII and VIII, the fluid-supply system for the lifting-motor assembly is diagrammatically illustrated. This system comprises a compressor 62 which delivers to a reservoir 63 which, in turn, is connected by a pipeline 64 through a three-way valve 65 with the cylinder 59 of the conveyor-lifting assembly.

The conveyors are driven from a single motor 66 that is mounted on the platform 53 and is supplied with current through a cable carried by the reel 55. The motor 66, through a chain 67 drives a sprocket wheel 68. Desirably, as shown, the lower and upwardly moving reach of sprocket chain 67 engages with a chain-tightening idler sprocket 69. The sprocket wheel 68 is secured to the cross shaft 34, the sprockets 42 of which are engaged by the chain of auxiliary conveyor 40. The roller 26, which carries sprockets 27 engaged by chain elements 24 of conveyor 21, is connected with and driven by the cross shaft 34 through a sprocket and chain assembly which includes sprocket 70, chain 71, and sprocket 72. The different driving and driven mechanisms are so related that the conveyors 21 and 40 are driven simultaneously and at the proper relative speeds to deliver material from the cargo space 7 in a deep stream at a relatively low speed, and to reduce the stream to a relatively shallow one carried at a higher speed by the conveyor 40, as described before. As shown sprocket 70 carried by the cross shaft 34 is one-half the diameter of sprocket 72 on roller 26, so that the auxiliary conveyor 40 driven by cross shaft 34 travels at twice the speed of main conveyor 21 driven by roller 26. This ratio may be varied, by changing one or both of these sprockets in accordance with the capacity of the cargo-carrying body of the vehicle and the tendency of the material to pack on the conveyors. In all cases, however, the relatively high speed at which the auxiliary conveyor operates provides great advantage in use of the vehicle, because the auxiliary conveyor serves only as an instrument for discharging the vehicle, and it is important therefore that it be adapted to the carrying and movement of material in a cargo-carrying body of large capacity.

The compressor 62 is also driven by the motor 66 which is operated only during operation of the conveyor. It has been determined that this limited operation of the compressor is ample to store a sufficient supply of fluid pressure in the reservoir 63 to perform the work of raising the auxiliary conveyor structure 37 when unloading of the vehicle is to be accomplished. In the normal operation of loading the vehicle by a loading machine with coal which is to be carried to mine cars, the operation of the conveyor for positioning the load in the cargo-carrying body of the vehicle usually suffices to charge the reservoir. If necessary or desirable, however, the conveyors may be run on the return trip to the loader when the vehicle is empty, additionally to build up reservoir pressure.

As pressure fluid for operating the piston and cylinder assembly compressed air is preferred, by reason of its elastic nature. This is for the reason that with the conveyor structure 37 supported by compressed air within the cylinder 59, should the auxiliary conveyor structure 37 strike against an overhead obstruction during travel of the vehicle, the resilient body of air will operate as a shock absorber and will yield to concussion, thereby avoiding damage to the structure.

Referring again to Figs. VII and VIII, the numeral 73 indicates hydraulic brake lines connected with brake-operating assemblies 74. The closed hydraulic brake system is controlled by a master cylinder 75, and is foot-operated by means of pedals 76.

It may be stated generally that the vehicle of our invention combines several features correlated to give advantages desirable from each and cooperative to provide a vehicle having novel and characteristic utility for haulage of specialized sort, such as coal-mine haulage. Thus it incorporates the feature of an auxiliary unloading conveyor with a cargo-carrying body which is of relatively great capacity, and which is mounted on an underlying structure having a wheel base of such length that it carries its load in balance for transportation. The weights of the several elements of the structure are also so related with respect to each other and with respect to the wheel base of the vehicle that the auxiliary conveyor does not under any expected condition of use overbalance the cargo-carrying body of the vehicle. As above explained, the auxiliary conveyor associated with the cargo-carrying body is organized to discharge the material carried in that body in a thin stream at desirably high speed, and is also adjustable under the influence of means operated by fluid pressure between an inoperative position within the overall height of the cargo-carrying body and a discharging position above the highest extent of the cargo-carrying body. It is also to be noted, and this feature appears particularly in Figs. II and III of the drawings, that the arrangement of the main and auxiliary conveyors with respect to each other and to the cargo-carrying body of the vehicle is such that the capacity of the body is retained in maximum order, because the upward inclination of the main conveyor is present only at the discharge end of the vehicle, and because the structure and arrangement of the auxiliary conveyor places the receiving end of its rearwardly declining portion at a relatively low level in the general structure of the vehicle. This lessens the required inclination of the discharging or elevating region of the main conveyor and thus conserves carrying space within the vehicle body.

It is also to be noted that all the several propelling and controlling instrumentalities of the vehicle organization are within a space bounded by the vertical and lateral limits of the frame and body structure of the vehicle, as is also space for the accommodation of the operator. Thus, it will be seen that, at the discharge end of the vehicle, the cable reel, operator's platform, conveyor motor, elevating cylinder for the auxiliary conveyor, and the pressure tank for that cylinder are all below the conveyors and within the lateral bounds of the vehicle primary structure, also power sources for driving the vehicle wheels, together with brake and steering connections are within those bounds. This has been done while reserving a large cargo-carrying space within the limits of a vehicle organized to operate within areas severely limited both in height and in width.

The foregoing description and accompanying drawings are exemplary of a physical embodiment of our invention within the ambit of which many changes in the form and arrangement of structural elements may be made; and it is therefore our intent that the scope of our invention be restricted only by the limitations contained in the claims appended hereto.

I claim as my invention:

1. A self-unloading mine-haulage vehicle comprising a wheel-mounted body enclosing a cargo space and having such arrangement with respect to the vehicle wheels as to support a capacity cargo in the cargo space with its center of gravity between the wheels, the said body having an open discharge end and a bottom-forming conveyor arranged to convey material in the cargo space through the said discharge end, a delivery conveyor projecting longitudinally from the said body, the said delivery conveyor being arranged to receive material from the said discharge opening and to deliver it at a level higher than the top of the vehicle body, and means for driving the delivery conveyor faster than said bottom-forming conveyor whereby the depth of material traveling on the delivery conveyor is less than the material on the other conveyor.

2. A self-unloading mine-haulage vehicle comprising a wheel-mounted body of limited height for use in mines, the said body enclosing a cargo space and having such arrangement with respect to the vehicle wheels as to support a capacity cargo in the cargo space with its center of gravity between the wheels, the said body having an open discharge end and being provided with a bottom-forming conveyor arranged to convey material in the cargo space through the said discharge end, a delivery conveyor projecting longitudinally from the said body and arranged to receive material from the discharge end, the said delivery conveyor having a delivery end and being mounted to the body for vertical adjustment of the said delivery end between a position below the top level of the vehicle body and a position above the said level, and means for driving the delivery conveyor faster than said bottom-forming conveyor whereby the delivery conveyor carries said material in a shallow stream.

3. In a self-unloading mine-haulage vehicle comprising a cargo-carrying body wheel-mounted and extended downwardly between and over its wheels to provide large cargo-carrying capacity for overall vertical and lateral dimensions; a discharge opening at one end of said body and adjacent the top thereof, a bottom-forming conveyor in the said body having a portion thereof reaching upward to the discharge opening of the body, an auxiliary delivery conveyor having a receiving end underlying the discharge end of the said bottom conveyor, relatively low side walls for the delivery conveyor, means for moving the structure of the said discharge conveyor from a position within the overall vertical limits of the vehicle body to an operative position projecting thereabove, and means for driving the delivery conveyor faster than said bottom-forming conveyor so that the material on the delivery conveyor will not spill over said low side walls.

4. A self-unloading mine haulage vehicle comprising a body with relatively high side walls and an open discharge end, a bottom-forming conveyor in the body arranged to convey material to said discharge end, a delivery conveyor projecting longitudinally from said body and arranged to receive material from the other conveyor and to deliver it at a level higher than said bottom-forming conveyor, relatively low side walls for the delivery conveyor, and means for driving the delivery conveyor faster than the bottom-forming conveyor whereby to keep the stream of material thereon so shallow that all of it is retained between said low side walls.

5. A self-unloading mine haulage vehicle comprising a body with relatively high side walls and an open discharge end, a bottom-forming conveyor in the body arranged to convey material to said discharge end, a delivery conveyor projecting longitudinally from said body and arranged to receive material from the other conveyor, relatively low side walls for the delivery conveyor, means for raising the delivery end of the delivery conveyor to delivery material at a level above said body, and means for driving the delivery conveyor faster than the bottom-forming conveyor whereby to keep the stream of material thereon so shallow that it is retained between said side walls.

EINAR M. ARENTZEN.
ARTHUR L. LEE.